United States Patent [19]

Iwata et al.

[11] Patent Number: 5,509,308
[45] Date of Patent: Apr. 23, 1996

[54] ACCELERATION DETECTING APPARATUS

[75] Inventors: Hitoshi Iwata, Hashima; Katsuya Kogiso, Iwakura; Kenichi Kinoshita, Kuwana, all of Japan

[73] Assignee: Kabushiki Kaisha Tokai Rika Denki Seisakusho, Aichi, Japan

[21] Appl. No.: 322,566

[22] Filed: Oct. 13, 1994

[30] Foreign Application Priority Data

Oct. 13, 1993 [JP] Japan .................................. 5-256073
Aug. 23, 1994 [JP] Japan .................................. 6-198579

[51] Int. Cl.⁶ ..................................................... G01P 15/00
[52] U.S. Cl. ........................................................ 73/514.09
[58] Field of Search .............................. 73/721, 726, 727, 73/754, 516 R, 517 R, 526, 514.05, 514.09, 514.11, 514.12

[56] References Cited

U.S. PATENT DOCUMENTS

Re. 33,360  10/1990  Reynolds et al. .......................... 128/675
4,576,181    3/1986  Wallace et al. ............................ 128/675
4,658,651    4/1987  Le ................................................ 73/708
4,926,155    5/1990  Colla et al. ................................. 338/36
4,967,597   11/1990  Yamada et al. .

FOREIGN PATENT DOCUMENTS

3228149A1  2/1984  Germany .
4-310865  11/1992  Japan .

*Primary Examiner*—Hezron E. Williams
*Assistant Examiner*—Richard A. Moller
*Attorney, Agent, or Firm*—Nikaido Marmelstein Murray & Oram

[57] ABSTRACT

An accelerometer sensor is disclosed, utilizing a casing having a center axis, and a pressure sensitive element located at the bottom portion of the casing. A gel based medium is accommodated in the casing. Given that "x" denotes a positional deviation of the pressure sensitive element with respect to the center axis of the casing and that "h" denotes a height of the medium in the casing, the positional deviation (x) and the height (h) are set such that the value 2 x/h falls within a predetermined range and serves as a function of the anisotropic sensitivity ratio of the sensor.

8 Claims, 6 Drawing Sheets

ACCELERATION DETECTING APPARATUS

BACKGROUND OF THE INVENTION

1. Field of the Invention

The present invention generally relates to an accelerometer, and more particularly to an accelerometer sensor of a filled medium type, which detects the acceleration of an object to which the sensor is attached, based on medium pressure changes caused by the inertia of the medium.

2. Description of the Related Art

Air bags have become standard equipment in many of today's motor vehicles. With this emphasis on motor vehicle safety, it is important to ensure that air bag activation occurs only upon vehicle collision and not before. Ensuring activation of an air bag at the time of the collision of an automobile requires a sensor which accurately detects collision-related acceleration when needed.

FIG. 1 shows a typical example of a well-known accelerometer sensor, 41, of a cantilever type, suitable for use in an air-bag system. Japanese Unexamined Patent Publication Nos. 57-13362 and 1-156669 disclose other types of accelerometers incorporating pressure sensitive sensors.

The accelerometer sensor 41 shown in FIG. 1 has a substrate 44 for circuitry at the lower center in a casing 42. The substrate 44 has a through-hole 43 formed nearly in the center. The casing 42 has a lower chamber 45 defined inside by the substrate 44. A pressure sensitive element 46 is attached to this substrate 44 in the chamber 45 in such a way as to cover the through-hole 43.

As shown in FIG. 2, the pressure sensitive element 46 has a recessed shape formed by etching a rectangular parallelopiped base. The pressure sensitive element 46 has a thin wall 47 left out as a resulting of the etching. A plurality of strain gauges 48 are provided on the surface of the thin wall 47 as shown in FIG. 1 and are formed using silicon semiconductors manufactured through a diffusion process. Each strain gauge 48 detects deformation of the thin wall 47 caused by the pressure applied to the wall 47, and outputs an electric signal corresponding to that pressure as a detection signal. This pressure sensitive element 46 is generally called a diaphragm type semiconductor pressure sensitive sensor chip.

The pressure sensitive element 46 is electrically connected to an electric circuit provided on the substrate 44, which in turn is electrically connected to a lead wire 49 inserted in the casing 42.

The sensor 41 further has a diaphragm 50 provided inside the casing 42 and above the substrate 44. The space defined by the diaphragm 50 and the substrate 44 is filled with silicone oil as a medium sensitive to acceleration. The diaphragm 50 has a through-hole formed in the center portion with a weight 53 placed in this hole. The weight 53 is secured to the diaphragm 50 by a connector 51 attached to the bottom of the diaphragm 50. The casing 42 has a bore 52 formed in the top. The bore 52 permits communication between the space above the diaphragm 50 and the outside of the casing 42.

When the accelerometer sensor 41 and the object to which this sensor is attached are accelerated vertically, the diaphragm with the attached weight 53 shifts either upward or downward. The displacement of the diaphragm 50 propagates to the silicone oil, changing the oil pressure. As a result, the pressure sensitive element 46 receives variable pressures through the silicone oil, and its thin wall 47 bends and/or vibrates in response to pressure changes. Each strain gauge 48 senses the deformations of the thin wall 47 in connection with oil pressures, and outputs detection signals corresponding to the amount of the deformations. The intensity of the detected signal correlates with the magnitude of the acceleration of the object to which the sensor 41 is attached.

The above-described accelerometer sensor 41 however has several problems presented below. Since the medium contained in the casing 42 is silicone oil, it exhibits a rich fluidity. Unfortunately the pressure propagating speed of the silicone oil when accelerated tends to be slow. Silicone oil, moreover, lends itself to bubble formation. Bubbles in the silicone oil tend to buffer the fluidic flow of the oil.

It is difficult to improve the fall resistance of the sensor 41 (how much the sensor can endure the falling impact). In other words, since the silicone oil in the casing 42 has a high degree of fluidity, the chamber used to retain the silicone oil should be sealed airtight. To prevent increases in the internal pressure of the silicone oil and to minimize the thermal expansion related displacement of the diaphragm 50, a very thin (several hundred micro meters) bellows shaped diaphragm 50 can be used. The use of such thin diaphragm 50, however, leads to difficult manufacturing and assembling of the sensor 41, ultimately resulting in higher manufacturing costs. When the accelerometer sensor 41 is set sideways from the state in FIG. 1, for example, the silicone oil moves downward due to the gravity. The biasing of the oil in the sensor 41 causes the oil pressure around the element to change. This variation in oil pressure changes the offset voltage of the sensor 41, and in turn, deteriorates the anisotropic sensitivity of the acceleration sensor 41.

Even with the bellows type diaphragm 50, bubbles easily form in silicone oil when the oil is sealed. As previously mentioned, this tends to degrade the sensitivity of the pressure sensor element 41. To improve the sensitivity of the sensor 41, the weight 53 may be made heavier, the thin wall 47 thinner, or the spring elasticity of the diaphragm 50 may be reduced. However, airtight sealed silicone oil cannot sufficiently absorb the impulse produced by the weight 53.

A further disadvantage of conventional silicone oil filled accelerometers, is the so called dancing phenomenon that occurs when the silicone oil reacts to the particular impact. "Dancing" is the phenomenon in which the silicone oil in a stationary state vibrates and this vibration continues for a certain period of time. This phenomenon deteriorates the detection reliability of the accelerometer sensor 41 which requires a response particularly within 100 milliseconds.

SUMMARY OF THE INVENTION

Accordingly, it is a primary objective of the present invention to provide an accelerometer sensor which has an excellent sensitivity, in particular, an excellent anisotropic sensitivity.

It is another objective of the present invention to provide an accelerometer sensor which has a simple structure to reduce the manufacturing cost.

To achieve the foregoing and other objects and in accordance with the purpose of the present invention, an improved accelerometer sensor is provided, which detects accelerations of an object to which the sensor is attached.

The sensor according to the present invention includes a casing having a center axis, and a pressure sensitive element located at the bottom portion of the casing. A gel based medium is accommodated in the casing. The medium applies pressure to the pressure sensitive element in accordance with the acceleration of the object. Given that "x" denotes a positional deviation of the pressure sensitive element with respect to the center axis of the casing and that "h" denotes a height of the medium in the casing, the positional deviation (x) and the height (h) are set such that a value 2 x/h is equal to or below a predetermined value, wherein the value 2 x/h serves as a function of the anisotropic sensitivity ratio of the sensor.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENT

An accelerometer sensor according to an embodiment of the present invention will now be described referring to the accompanying drawings.

Figure 3:
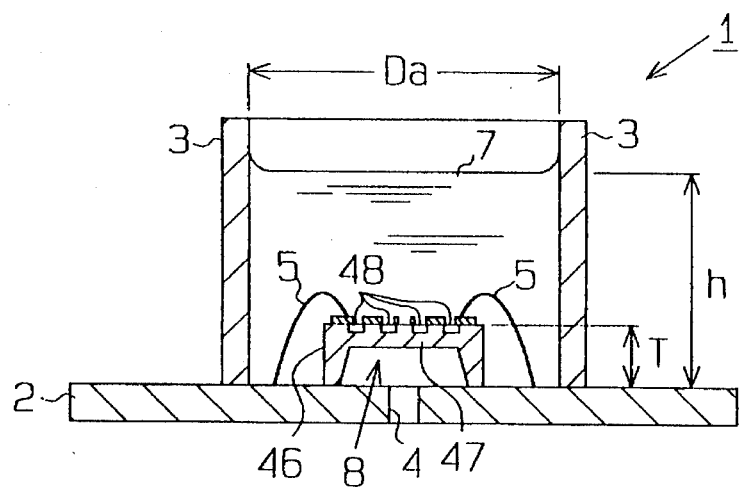
FIG. 3 is a vertical cross-sectional view illustrating an accelerometer sensor according to an embodiment of the present invention.
Figure 4:
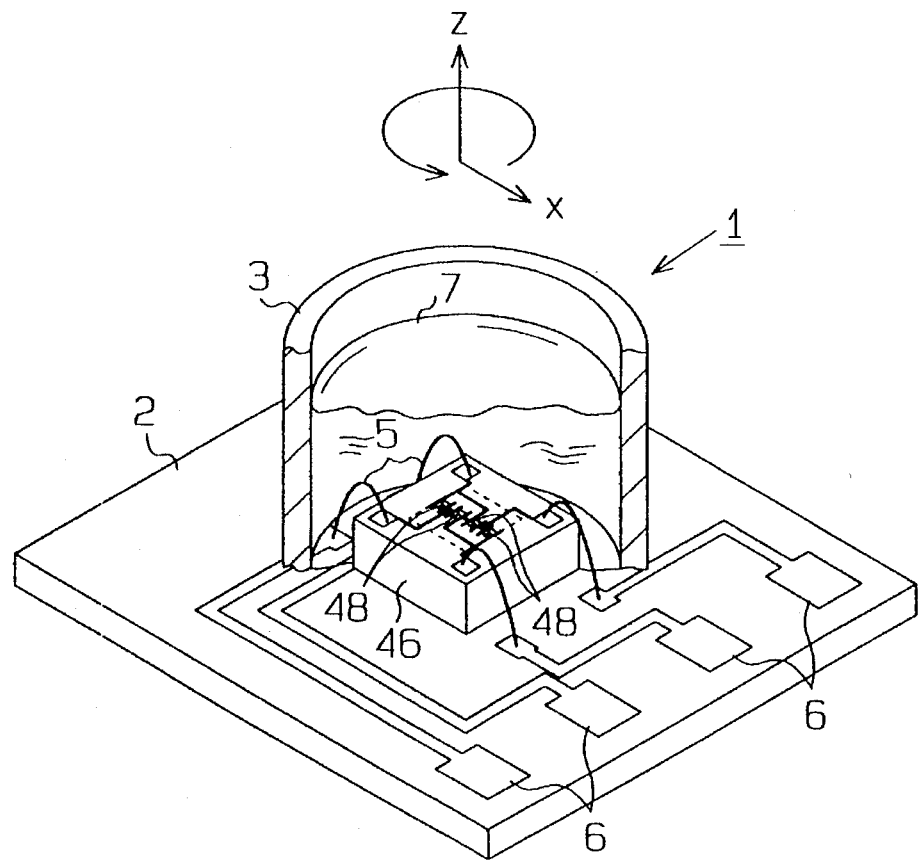
FIG. 4 is a cross-sectional perspective view of the sensor shown in FIG. 3.

As shown in FIGS. 3 and 4, a cylindrical sensor mount 3 serving as a casing is secured onto a substrate 2 made of ceramics or metal. The substrate 2 has a bore 4 formed in the center portion of an area surrounded by the sensor mount 3. A pressure sensitive element 46, called a diaphragm type semiconductor pressure sensitive sensor chip, is provided on the top of the substrate 2 in such a way as to block the bore 4.

Figure 2:
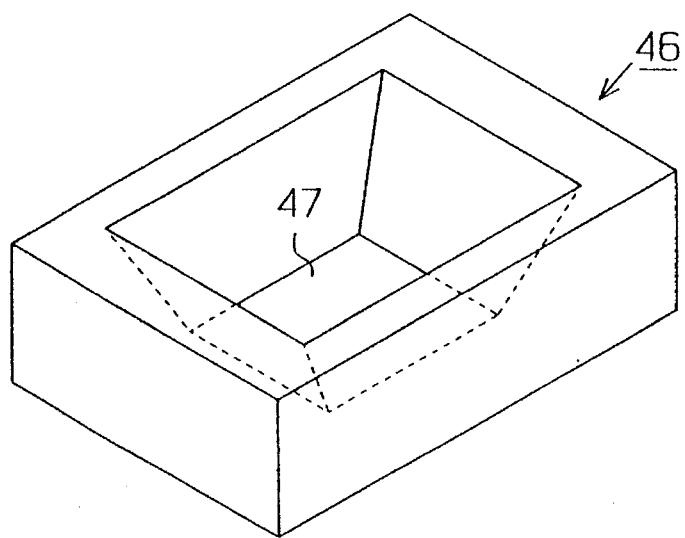
FIG. 2 is a perspective view showing a pressure sensitive element in the sensor shown in FIG. 1.

The pressure sensitive element 46 has a recessed shape, as shown in FIG. 2, formed by etching a rectangular parallelopiped base. The top of a recess 8, formed by the etching the pressure sensitive element 46, is a thin wall 47 which serves as a diaphragm. A plurality of strain gauges 48, formed using silicon semiconductors manufactured through diffusion process, are provided on the top surface of the thin wall 47. Each strain gauge 48 detects deformation of the thin wall 47 caused by the pressure applied to this wall 47, and outputs an electric signal corresponding to that deformation as a detection signal. For the sake of illustration, the relative thickness of the pressure sensitive element 46 is shown greater than it normally is.

The internal space of the recess 8 at the lower side of the thin wall 47 is connected to the outside of the sensor mount 3 via the bore 4. A plurality of bonding wires 5 electrically connect the pressure sensitive element 46 to an interconnection pattern 6 formed on the substrate 2. The sensor mount 3 accommodates an acceleration sensitive medium 7 consisting of a gel composition having a predetermined density. The liquid level of the medium 7 reaches way beyond the top surface of the pressure sensitive element 46. The gel composition used in this embodiment is silicone gel (density of about 0.9 g/cm$^3$ to 1.3 g/cm$^3$).

The action of the accelerometer sensor 1 will now be explained. The instant the object to which the accelerometer sensor 1 is attached is accelerated, the pressure of the medium 7 on the pressure sensitive element 46 varies. The change in pressure applied on the pressure sensitive element 46 bends and vibrates the thin wall 47 of the pressure sensitive element 46. Although the volume of the recess 8 at the lower side of the thin wall 47 will undergo a slight change, due to the bending and vibration of the thin wall 47, the air pressure in the recess 8 will not influence the thin wall 47 because the recess 8 is connected to the outside of the sensor mount 3 via the bore 4.

Each strain gauge 48 senses the bending and vibration of the thin wall 47 and outputs a detection signal according to the degree of deformation caused by the bending and vibration of the thin wall 47, wherein the degree of deformation correlates with the magnitude of pressure applied on the thin wall 47. In other words, the level of the detection signal from the strain gauge 48 (or pressure sensitive element 46) reflects the magnitude of the acceleration of the accelerometer sensor 1 and the object to which the sensor 1 is attached. The detection signal is supplied via the bonding wires 5 and interconnection pattern 6 to an external circuit (not shown) to which the accelerometer sensor 1 is connected.

Figure 5:
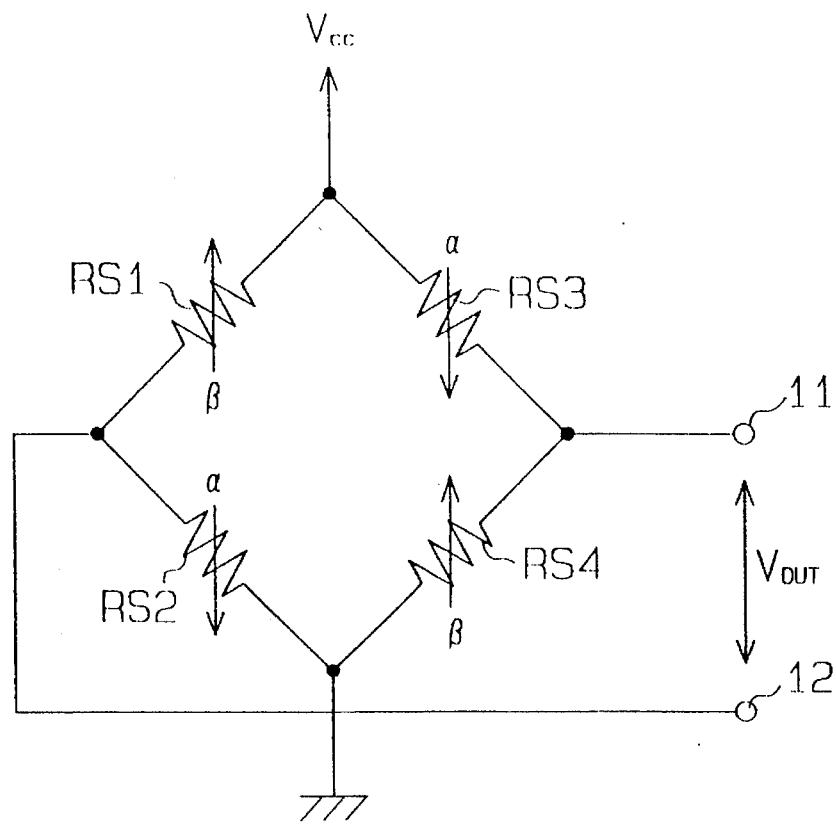
FIG. 5 is an equivalent circuit diagram of a pressure sensitive element used in the embodiment.

FIG. 5 shows the equivalent circuit of the pressure sensitive element 46. The pressure sensitive element 46 comprises four bridge-connected strain resistors RS1 to RS4. A high-potential supply voltage $V_{cc}$ is applied to the node between the resistors RS1 and RS3. The node between the resistors RS2 and RS4 is grounded. The node between the resistors RS3 and RS4 is connected to a first output terminal 11. The node between the resistors RS1 and RS2 is connected to a second output terminal 12. As shown schematically in FIG. 6, the individual resistors RS1 to RS4 are laid out at predetermined positions along the thin wall 47.

When pressure is applied to the pressure sensitive element 46, the resistances of the strain resistors RS2 and RS3 decrease (the arrow α in FIG. 5) while the resistances of the strain resistors RS1 and RS4 increase (the arrow β in FIG. 5). As a result, the pressure sensitive element 46 outputs a detection signal corresponding to the pressure applied to the element 46, that is, a sensor voltage $V_{OUT}$ is produced between both output terminals 11 and 12.

Figure 7:
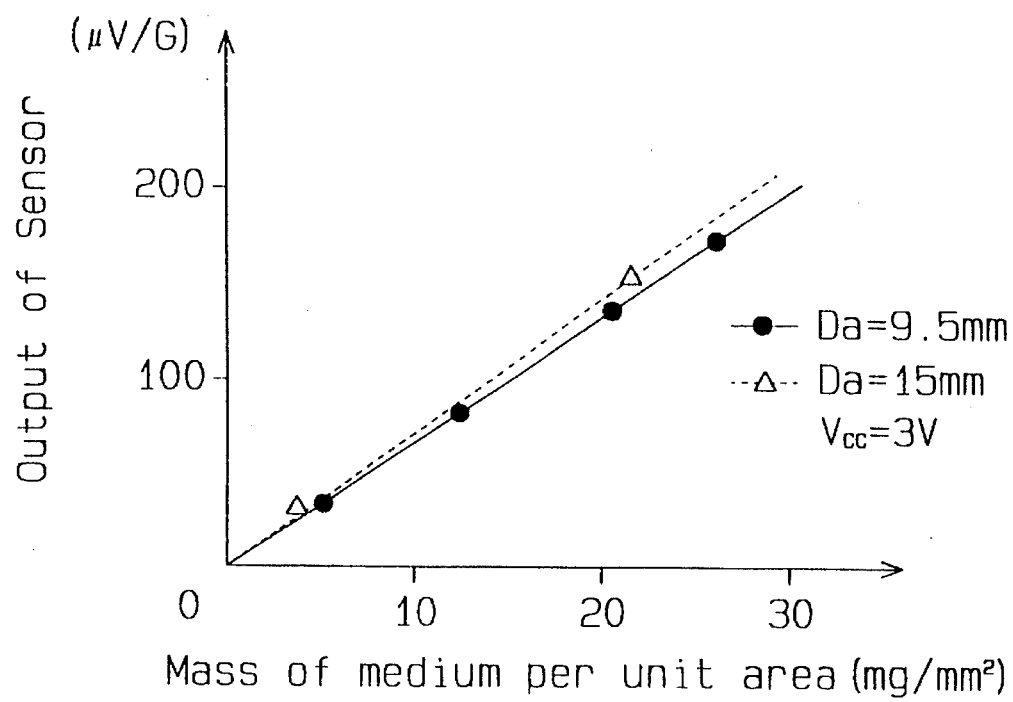
FIG. 7 is a graph showing the relationship between the mass of a medium per unit area and the sensor output.

The graph shown in FIG. 7 illustrates the relationship between the mass of the medium 7 (silicone gel) per unit area in the horizontal cross section of the sensor mount 3 and the output of the accelerometer sensor 1 (i.e. the sensitivity of the accelerometer). In the graph, the solid line shows the actual measurements with Da=9.5 mm where Da is the diameter of the sensor mount 3, while the broken line shows the actual measurements with Da=15 mm. This graph suggests that the sensitivity of the accelerometer sensor 1 is fairly unrelated to the diameter Da of the sensor mount 3, but is proportional to the mass of the medium 7.

Figure 6:
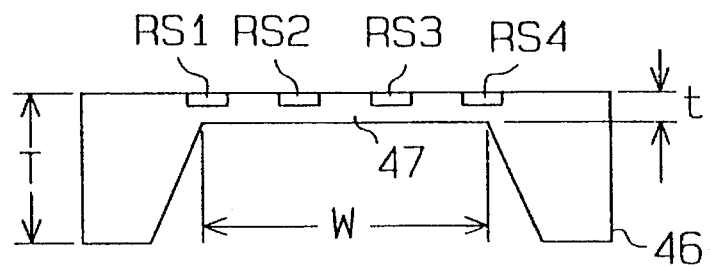
FIG. 6 is a schematic diagram showing the layout of four strain resistors in the pressure sensitive element.

The relationship given in FIG. 7 is also confirmed theoretically from the following equation (1) where SS is the output sensitivity of the accelerometer sensor 1 and SE ($\mu$V/(Kg/cm$^2$)) is the output sensitivity of the pressure sensitive element 46. The output sensitivity SE is proportional to the supply voltage $V_{cc}$, which is constant (3 V) in this embodiment.

$$SS = K \cdot (M/S) \cdot SE \quad (\mu V/G) \tag{1}$$

where k: proportional constant (1/G)
M: mass of medium 7 = $\rho \cdot S \cdot h$ (Kg)
where $\rho$: density of medium 7
S: bottom area of sensor mount 3 (cm$^2$)
h: height of medium 7 (cm)
T: height of pressure sensitive element 46 including strain gauges 48 (cm); h >> T
(see FIGS. 3 and 6).

This equation (1) shows that given a constant output sensitivity level SE produced by the pressure sensitive element 46, the output sensitivity SS of the accelerometer sensor 1 can be adjusted by increasing or decreasing the mass M of the medium 7. In other words, even after the accelerometer sensor 1 is assembled, the output sensitivity of the accelerometer sensor 1 can be adjusted by increasing or decreasing the mass of the medium 7. Because the bottom area S of the sensor mount 3 remains constant, output sensitivity can thus be adjusted by increasing or decreasing the height h of the medium 7.

Figure 8:
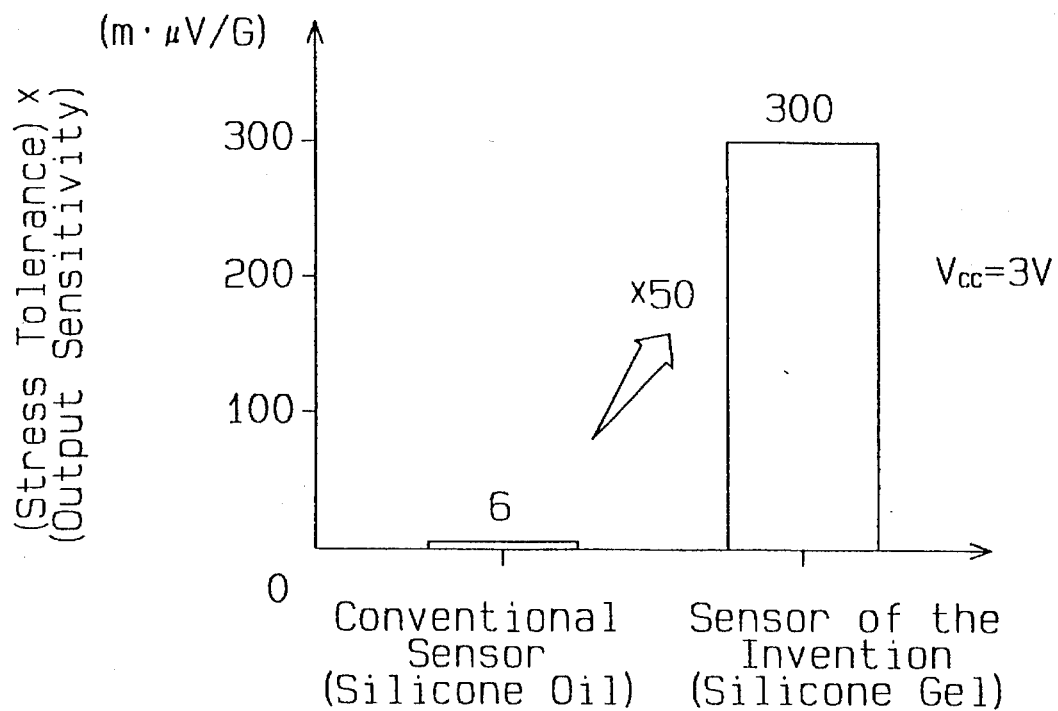
FIG. 8 is a graph showing the relationship between the proof stress of the sensor when the sensor is dropped on a concrete floor from a predetermined height, and the output sensitivity of the sensor.

FIG. 8 illustrates the results of stress tolerance test of the elements incorporated in the conventional accelerometer sensor versus those elements incorporated in the sensor 1 according to the present embodiment. In the graph in this diagram, the vertical scale represents the product (m.$\mu$V/G) of the element's stress tolerance and the element's output sensitivity, where m=meter, $\mu$V=micro volts and G= gravity. Tolerance was measured with both sensors being dropped from equal heights. Measured result according to this embodiment (=300) is 50 times as large as that of the conventional art (=6). This is because silicone gel has higher shock absorption value than does silicone oil. This absorption allows the silicone gel to exhibit improved dumping characteristics when the pressure sensitive element 46 experiences changes in pressure propagation. Assuming that the element of this embodiment and the element of the conventional sensor have the same resistance to breakage (i.e., when both are dropped on a concrete floor from a height of 1 m), the sensitivity of this embodiment will be 50 times larger than that of the conventional sensor.

Figure 9:
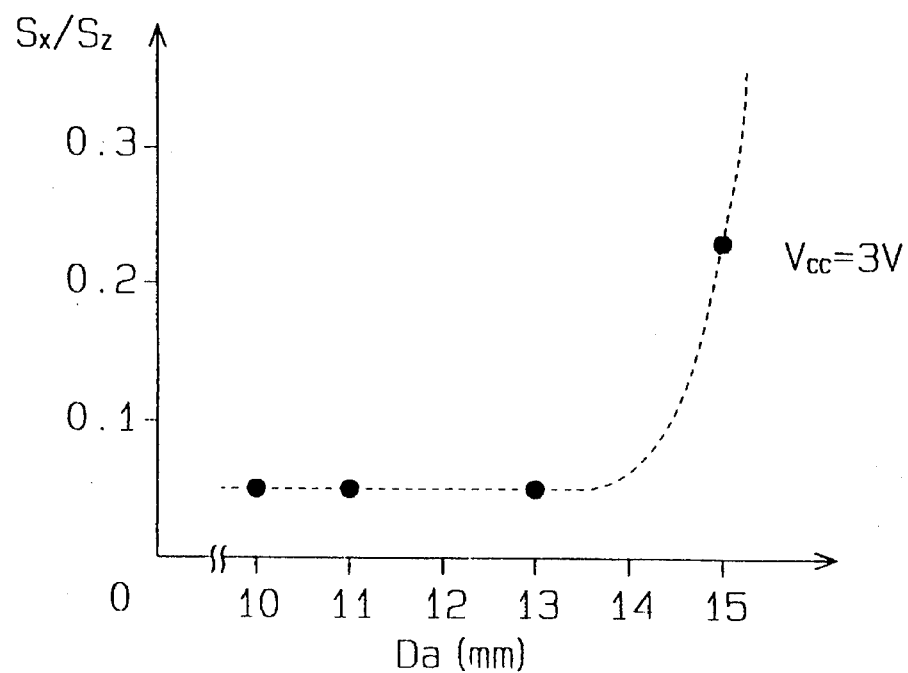
FIG. 9 is a graph showing the relationship between the diameter of a sensor mount and an anisotropic sensitivity.

FIG. 9 shows the relationship between the diameter Da of the sensor mount 3 and the anisotropic sensitivity ratio. The anisotropic sensitivity is defined as a ratio, $S_x/S_z$, of the output sensitivity $S_x$ in the X direction (horizontal direction) to the output sensitivity $S_z$ in the Z direction (vertical direction) (see FIG. 4). The accelerometer sensor 1 should selectively detect only the acceleration in one effective direction (i.e., the Z direction in FIG. 4). It is therefore essential that the effective accelerometer sensor 1 should have a small anisotropic sensitivity ratio $S_x/S_z$.

The slope of the curve in FIG. 9, which is obtained by plotting the relation between the diameter Da and the ratio $S_x/S_z$, sharply increases after a certain value. To keep the anisotropic sensitivity ratio $S_x/S_z$, of the sensor 1 small, therefore, the diameter Da of the sensor mount 3 should be set less than the value (between 13 and 15) after which the anisotropic sensitivity ratio $S_x/S_z$ starts increasing. To set the ratio $S_x/S_z$ equal to or smaller than 0.05 (=1/20) when $V_{cc}$=3 (V), for example, the diameter Da should be set equal to or less than 13 mm. When the height h=10 mm and the positional deviation x=0.25 mm. The positional deviation, x, is an index indicating the deviation of the pressure sensitive element 46 from a predetermined position. In particular deviation x means the distance (mm) from the origin O in FIG. 11 which lies on the center axis of the sensor mount 3 to the center of the pressure sensitive element 46 in the X direction.

Figure 10:
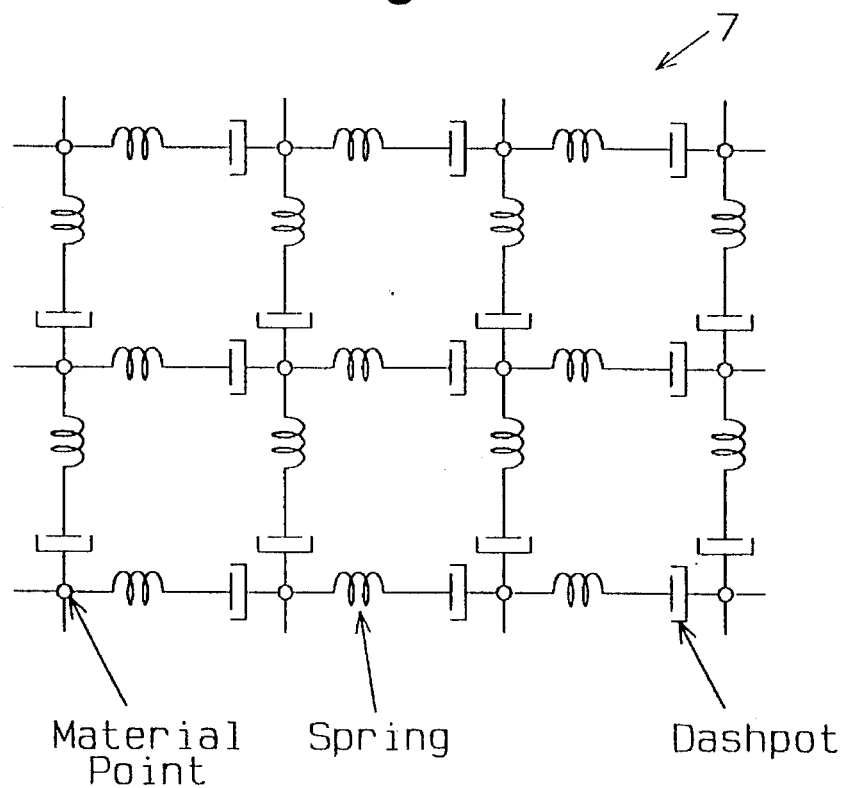
FIG. 10 is an exemplary diagram showing the characteristic of an acceleration sensitive medium consisting of a gel composition, as a mechanical structure.

The principle of the pressure detection by the accelerometer sensor 1 will now be described with reference to FIGS. 6 and 10 to 12. FIG. 10 is an exemplary diagram showing the characteristic of the medium 7 (i.e., silicone gel) regarded as a mechanical structure. The gel medium 7 can be considered as an elastic member having a three-dimensional net structure in which material points are mutually linked by springs and dashpots.

Figure 11:
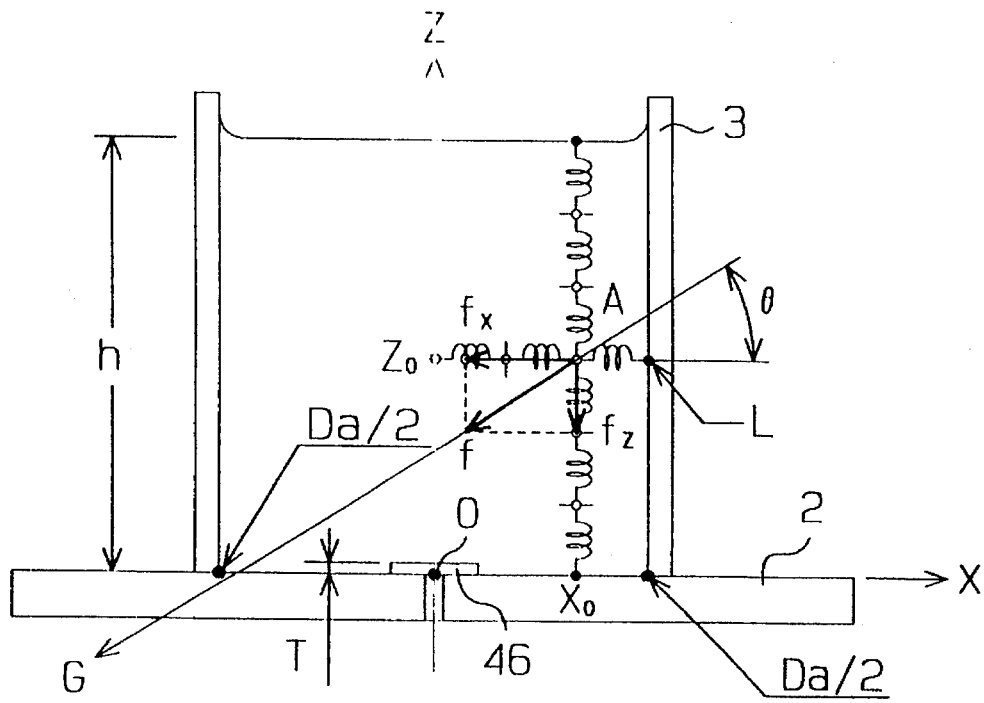
FIG. 11 is a diagram for explaining the generation of medium pressure originating from the acceleration.
Figure 12:
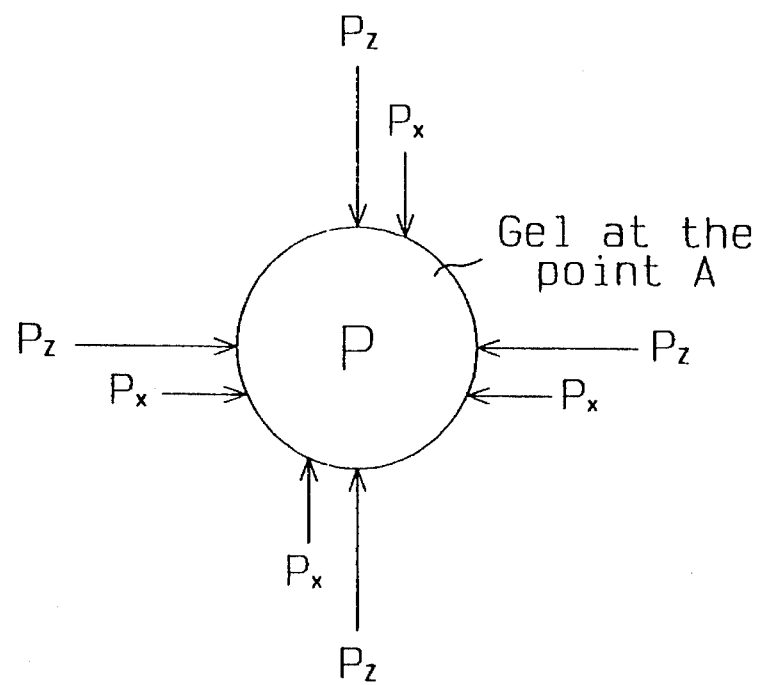
FIG. 12 is a diagram for explaining the pressure that acts on one point in the medium.

FIG. 11 illustrates this with a model for explaining the generation of medium pressure originating from an acceleration G. The oblique arrow in FIG. 11 represents the direction of the acceleration G. This forms a predetermined angle $\theta$ with respect to X direction. In FIG. 11, the origin O lies on the coordinates (x, z)=(0, 0). Arbitrary point A lies on the coordinates (x, z)=($X_0$, $Z_0$). "L" is the point where a line horizontal to the material point A is secured to the inner wall of the sensor mount 3 via a spring. The (x,z) coordinates of L are (Da/2, Z,). FIG. 12 conceptually shows the pressures $P_x$ and $P_z$ that acts on the material point A in the medium 7.

Given that "$\rho$" is the density (g/cm$^3$) of the medium 7, f=$\rho$G, which is the force (gf/cm$^3$) acting on a unit volume of the medium 7, $f_z$=$\rho$Gsin$\theta$, which is the force (gf/cm$^3$) acting in the Z direction and $f_x$=$\rho$Gcos$\theta$, which is the force (gf/cm$^3$) acting in the X direction, the compression force F, per unit area which is generated by the component force f, in the Z direction at the material point A is obtained from the following equation (2).

$$F_Z = \int_{Z_0}^{h} f_z dZ = \int_{Z_0}^{h} \rho G\sin\theta dZ = \rho G(h-Z_0)\sin\theta \; [gf/cm^2] \tag{2}$$

Likewise, the compression force $F_X$ per unit area which is generated by the component force $f_X$ in the X direction at the material point A is obtained from the following equation (3).

$$\begin{aligned} Fx &= \int_{X_0}^{D_a/2} f_x dx - \int_{-Da/2}^{X_0} f_x dx \\ &= \int_{X_0}^{D_a/2} \rho G\cos\theta dX - \int_{-Da/2}^{X_0} \rho G\cos\theta dx \\ &= -2\rho G X_0 \cos\theta \quad [gf/cm^2] \end{aligned} \tag{3}$$

The second integration term in the equation (3) means that the medium within the range of ('Da/2) to $x_0$ acts as tension because the medium is in contact with and is secured to the inner wall of the sensor mount 3 at the point L in FIG. 11.

From the equations (2) and (3), the total pressure P acting on the material point A is expressed by the following equation (4).

$$P = P_Z + P_X = F_Z + F_X \quad (4)$$
$$= \rho G\{(h-z_0)\sin\theta - 2x_0\cos\theta\} \quad (gf/cm^2)$$

The pressure P on the top surface of the pressure sensitive element 46 is obtained by substituting $z_0=T$ in the above equation, and the thickness T of the element 46 is small enough to be negligible ($T\approx 0$). Thus, the pressure P on the top surface of the element 46 is approximated as given by the following equation (5).

$$P=\rho G(h\sin\theta - 2x_0\cos\theta) \quad (gf/cm^2) \quad (5)$$

The output sensitivity $S_X$ in the X direction and the output sensitivity S, in the Z direction are respectively proportional to the compression force $F_X$ in the horizontal direction ($\theta=0°$) and the compression force $F_Z$ in the vertical direction ($\theta=90°$). Therefore, by using the approximation $z_0=T\approx 0$, the anisotropic sensitivity ratio $S_X/S_Z$ is expressed by the following equation (6).

$$(S_X/S_Z) = F_X(\theta=0°)/F_Z(\theta=90°) \quad (6)$$
$$= 2x_0/h$$

The equation (6) suggests that for the purpose of improving the anisotropic sensitivity (i.e. reducing the anisotropic sensitivity ratio), (1) the height h of the medium 7 should be increased, and (2) the value $x_0$ should be decreased, wherein the value $x_0$ means the positional deviation x of the pressure sensitive element 46. For example, in order to set the ratio $S_X/S_Z$ equal to or smaller than 0.05 (=1/20), the positional deviation x should be set to be $x \leq 0.25$ mm when h=10 mm.

By setting the height h and the positional deviation x to proper values, the anisotropic sensitivity ratio should be set to equal to or below 0.1 (=1/10), preferably equal to or below 0.05 (=1/20), more preferably equal to or below 0.025 (=1/40) and most preferably equal to or below 0.02 (=1/50).

The relationship between the pressure P and the sensor output voltage $V_{OUT}$ will now be discussed. Assuming that the resistors RS1 to RS4 are located at the positions shown in FIG. 6, equations (7A) and (7B) below are satisfied.

$$\Delta R_S/R_S = K\epsilon \quad (7A)$$

where $R_S$: combined resistance of the resistors RS1 to RS4
$\Delta R_S$: a change in combined resistance of the resistors RS1 to RS4
K: gauge factor
$\epsilon$: distortion factor.

$$\epsilon = K'(w/t)^2 \cdot P \quad (7B)$$

where K': constant determined by the material or shape (e.g., the elasticity of silicone may be used)
w: width of the thin wall 47 of the pressure sensitive element 46 (see FIG. 6)
t: thickness of the thin wall 47 (see FIG. 6).

From the equations (7A) and (7B), the following equation (7) is satisfied.

$$\Delta R_S/R_s = K \cdot K'(w/t)^2 p \quad (7)$$

The potential difference $V_{OUT}$ between the terminals 11 and 12 is expressed by the following equation (8A).

$$V_{OUT} = \{(R_S4+\Delta R_S4)/(R_S3-\Delta R_S3+R_S4+\Delta R_S4)\} \cdot V_{CC} - \quad (8A)$$
$$\{(R_S2-\Delta R_S2)/(R_S1+\Delta R_S1+R_S2-\Delta R_S2)\} \cdot V_{CC}$$
$$= (\Delta R_S/R_S) \cdot V_{CC}$$

Substituting the equation (7) into the equation (8A) yields $$V_{OUT}=K \cdot K'(w/t)^2 \cdot P \cdot V_{CC} \quad (8)$$

Further substituting the equation (5) into the equation (8) yields $$V_{OUT}=K \cdot K'(w/t)^2 \cdot \rho G(h\sin\theta - 2x\cos\theta) \cdot V_{CC} \quad (9)$$

It is apparent from the equation (9) that the sensor output voltage $V_{OUT}$ increases with an increase in the height h of the medium 7 and decreases with an increase in the positional deviation x of the element 46.

According to this embodiment, as described in detail above, silicone gel having a lower fluidity than silicone oil is used as the acceleration sensitive medium 7. Under impact conditions, the silicone gel will not "dance", unlike silicone oil. Consequently, the accelerometer sensor 1 of this embodiment also exhibits exceptionally consistent detection characteristics. Further, silicone gel need not be sealed airtight in the sensor mount and bubbles are unlikely to be produced in the silicone gel. Accordingly, the accelerometer sensor using silicone gel will not have any disadvantages simply because of bubble formation.

Silicone gel has an excellent shock absorption, and has a lower fluidity than silicone oil. Therefore, no particular contrivance is needed to prevent the leakage of the medium 7 when the accelerometer sensor 1 is manufactured. This makes the manufacture of the accelerometer sensor 1 easier than the conventional art.

According to the present invention, the output sensitivity of the accelerometer sensor 1 can be controlled by adjusting the amount of the medium 7 (by adjusting the height h of the medium 7, for example). In particular, the anisotropic sensitivity can be improved by reducing the diameter Da of the sensor mount 3, increasing the height h of the medium 7 and minimizing the positional deviation x of the pressure sensitive element 46.

Figure 1:
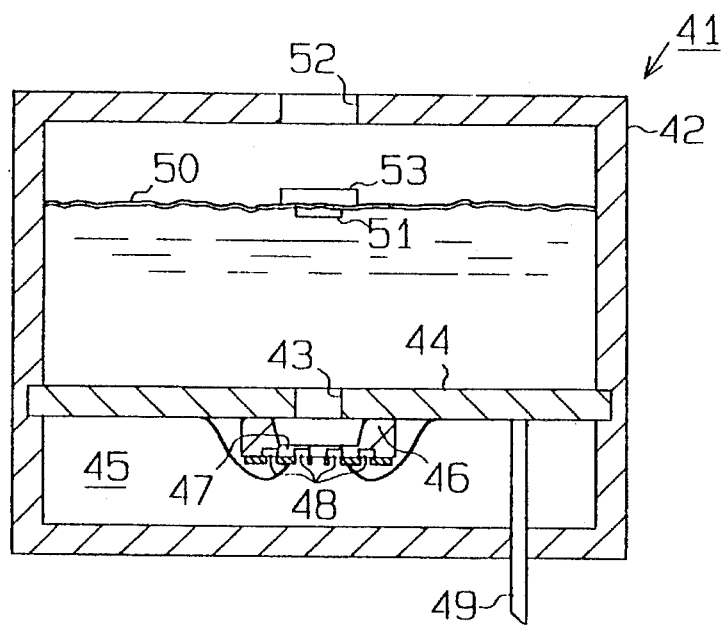
FIG. 1 is a vertical cross-sectional view illustrating a conventional accelerometer sensor.

Furthermore, the accelerometer sensor 1 of this invention does not require the diaphragm 50, weight 53, connector 51 and airtight sealing casing 42 as shown in FIG. 1. The structure of the sensor of this invention is therefore simpler than that of the conventional art, contributing to the reduction in the manufacturing cost of the sensor.

Although only one embodiment of the present invention has been described herein, it should be apparent to those skilled in the art that the present invention may be embodied in many other specific forms without departing from the spirit or scope of the invention. Particularly, it should be understood that this invention may be embodied in the following forms.

Gel composition as the acceleration sensitive medium 7 used in this invention may be other compositions than silicone gel as long as they do not adversely affect the substrate 2 and pressure sensitive element 46. Accordingly, the gel medium may be high polymer gel consisting essentially of polyvinyl alcohol.

In order to adjust the output sensitivity of the accelerometer sensor 1, the mass of the medium 7 may be adjusted by dispersing particles of a material having the proper mass (e.g. metal, ceramics or synthetic resin) into the gel composition. When the material to be dispersed in the gel composition is metal, it is preferable that the metal has a relatively large specific gravity, such as copper, iron or nickel. Of course, a plurality of metals, or a mixture of metal, ceramics and synthetic resin may be dispersed in the gel composition.

The pressure sensitive element used in this invention may take any shape as long as it is of a diaphragm type. Although a diaphragm type semiconductor pressure sensitive sensor chip having strain gauges 48 is used as the pressure sensitive element 46 in the above-described embodiment, any diaphragm type pressure sensitive element can be used as long as it does not have any holes in its surface. Such elements include, for example, a diaphragm type pressure sensitive sensor chip or diaphragm type capacitive pressure sensitive sensor chip, which uses a thin-film gauge.

The interconnection pattern 6 may be omitted, and the bonding wires 5 may be extend from the sensor mount 3 as lead wires.

A cover having a through-hole formed therein may be attached to the top of the sensor mount 3.

Although the sensor mount 3 is a cylinder having a circular horizontal cross section in the above-described embodiment, it should not necessarily be strictly symmetrical with respect to the center axis. That is, it is sufficient that the sensor mount 3 is approximately cylindrical, or the sensor mount 3 may be a cylinder having a polygonal horizontal cross section. In this specification, "nearly cylindrical casing (i.e., sensor mount 3)" means a casing which has such a horizontal cross section as to specify the center axis. Of course, it is possible to use a sensor mount having a horizontal cross section asymmetrical with respect to the center axis.

The accelerometer sensor 1 according to the present invention may be adapted for use in other safety devices than air-bag systems, and anti-skid braking systems and active suspensions of automobiles.

Therefore, the present examples and embodiment are to be considered as illustrative and not restrictive and the invention is not to be limited to the details given herein, but may be modified within the scope of the appended claims.

What is claimed is:

1. A sensor for detecting the acceleration of an object to which the sensor is attached, comprising:

a casing having a bottom portion and a center axis;

a pressure sensitive element located at the bottom portion of said casing at a position that deviates from said center axis by a value "x"; and a gel based medium filled within said casing to a height "h", measured relative to the height of said casing, said medium being used to apply pressure to said pressure sensitive element, said value x and said height h being adjusted to set an anisotropic sensitivity ratio of the sensor to a desired value, wherein the anisotropic ratio is equal to the value of 2 x/h.

2. The sensor according to claim 1, wherein said medium is silicone gel.

3. The sensor according to claim 1, wherein said medium is high polymer gel consisting essentially of polyvinyl alcohol.

4. The sensor according to claim 1, wherein said medium includes particles dispersed in said medium, said particles being at least one kind of particles selected from the group consisting of metal particles, ceramics particles and synthetic resin particles.

5. The sensor according to claim 1, wherein said value 2 x/h is set to 0.05.

6. The sensor according to claim 1, wherein said pressure sensitive element is a diaphragm type semiconductor pressure sensitive sensor chip.

7. A sensor for detecting the acceleration of an object to which the sensor is attached, comprising:

a casing having a bottom portion and a center axis;

a pressure sensitive element located at the bottom portion of said casing at a position that deviates from said center axis by value "x"; and a gel based medium filled within said casing to a height "h", measured relative to the of said casing, said medium being used to apply pressure to said pressure sensitive element, said value x and said height h being adjusted to set an anisotropic sensitivity ratio of the sensor to a desired value, wherein the anisotropic ratio is equal to the value of 2 x/h, wherein said casing has a cylindrical shape with a diameter no bigger than 13 mm.

8. A method of setting the anisotropic sensitivity of an accelerometer sensor having a casing with a center axis, a pressure sensitive element disposed at the bottom portion of the casing, and a medium filled in the casing, the method comprising the steps of:

using a gel composition as said medium;

adjusting a height "h" of said medium in said casing and a positional deviation "x" of said pressure sensitive element with respect to the center axis of said casing, in order to set the anisotropic sensitivity ratio of said sensor to a desired value; and wherein the relationship between the height "h" of said medium in said casing and the deviation "x" of said pressure sensitive element from the center axis of said casing is 2 x/h, the value of which is a function of the anisotropic sensitivity ratio.

* * * * *